Oct. 26, 1937.　　　　C. E. RIDGWAY　　　　2,097,343
FRUIT BOX PAD, LINER, AND COLLAR
Filed Dec. 22, 1936
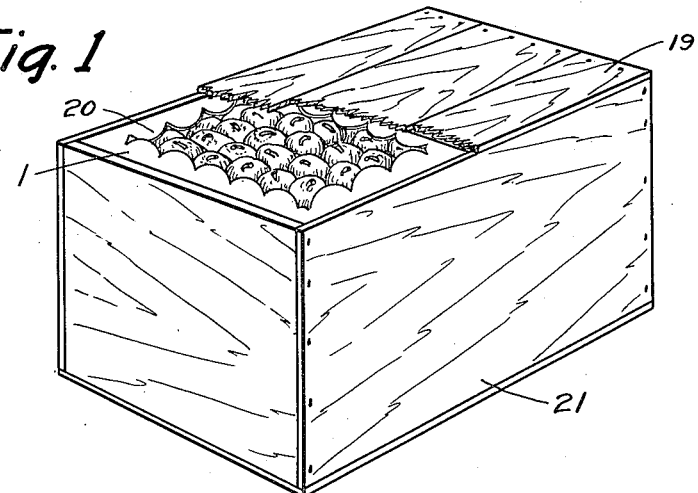
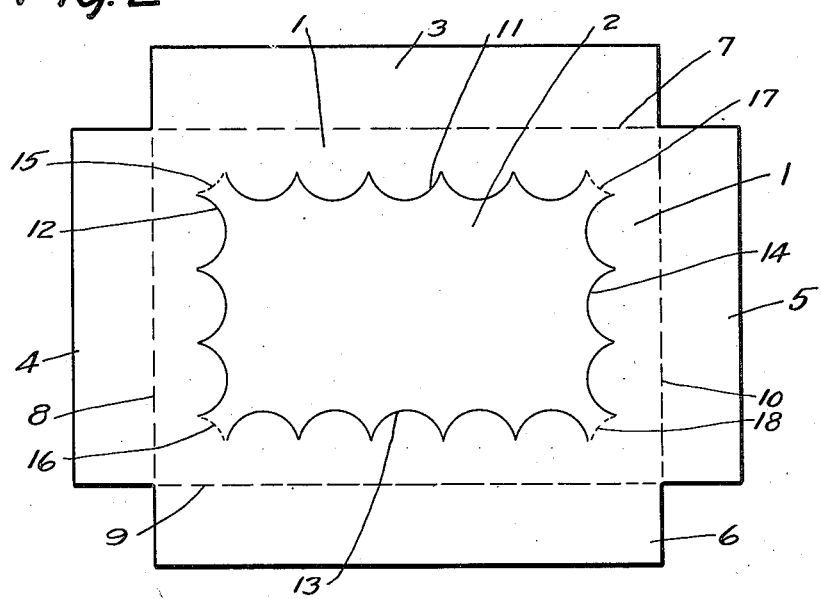
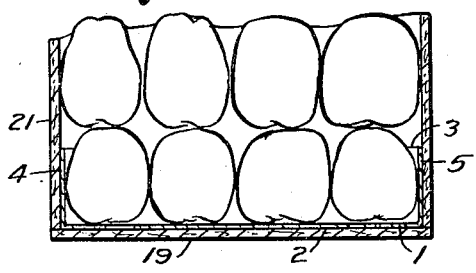
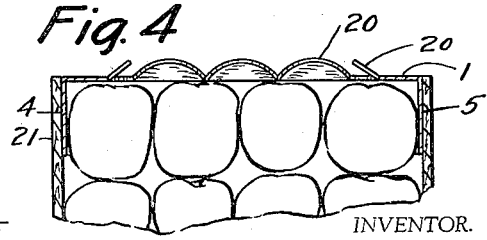
INVENTOR.
Carl E. Ridgway
BY James Harrison Bowen
ATTORNEY.

Patented Oct. 26, 1937

2,097,343

UNITED STATES PATENT OFFICE 2,097,343

FRUIT BOX PAD, LINER, AND COLLAR

Carl E. Ridgway, Seattle, Wash.

Application December 22, 1936, Serial No. 117,154

1 Claim. (Cl. 217—3)

The purpose of this invention is to provide a protecting pad for fruit packed in boxes and the like, which also provides an ornamental feature when the box is opened, and the central part of the pad removed.

The invention is a pad formed of relatively heavy soft paper having a continuous collar around the opening of the box, with flanges extending downward from the collar between the fruit and the inner walls of the box, and also having a removable portion in the central part with the edges scalloped and perforated at the corners, leaving a scalloped edge forming the inner edge of the collar, and through which the fruit is displayed, the upper or flat surface also providing a pad for the fruit before the cover of the box is removed.

Fruit, such as apples, pears, and the like, are ordinarily packed from the top of the box, and the fruit is sometimes wrapped with individual paper wrappers, however, some fruit is packed from the bottom, and ordinarily there is only a thin sheet of paper between the fruit and wood of the box, so that it is desired to provide a pad of slightly heavier material to protect the top of the fruit from the wood, and it has been found desirable to decorate the box with a fringe around the edge, and this invention combines the pad with a scalloped collar, so that when the box is opened, the central part of the pad may be removed, leaving the collar with the scalloped edges, and the scallops may be bent upward to display the fruit.

The object of the invention is, therefore, to provide a combination pad, collar, and liner for fruit boxes and the like.

Another object is to provide a decorative feature for fruit boxes which may be inserted as the box is packed.

Another object is to provide a decorative collar for fruit boxes and the like, in which the material from which the collar is formed provides a protective pad for the fruit in the box.

Another object is to provide a decorative collar for fruit boxes, having downwardly extending flanges by which the collar is held between the fruit and the inner surfaces of the box.

A further object is to provide a pad for fruit boxes and the like, in which a portion of the pad may be removed as the box is opened, and in which the remaining portion provides a decorative feature for the fruit.

And a still further object is to provide a combination pad for fruit boxes which protects the fruit while in storage and during shipping, and which also provides a decorative feature when the box is opened, which is of a simple and economical construction.

With these ends in view the invention embodies a sheet of material with the corners removed, having fold lines communicating with the corners, and having a scallop cut extending substantially around the inner part with perforations at the corners, providing a continuous collar connecting with flanges at the edges, and in which the central part may be removed.

Other features and advantages of the invention will appear from the following description, taken in connection with the drawing, wherein:

Figure 1 is a view showing a fruit box of the type formed in two halves, with a portion of the cover broken away showing the fruit with the pad in place, and with the central portion thereof removed.

Figure 2 is a plan view of the pad in the open position.

Figure 3 is a view showing a cross section through a fruit box in an inverted position, with the pad in the lower side, and with the fruit packed upon the pad.

Figure 4 is a view showing a cross section through a fruit box in the upright position with the cover removed, and with the central portion of the pad also removed.

In the drawing the device is shown as it may be made, wherein numeral 1 indicates the collar, numeral 2 the central portion of the pad, and numerals 3, 4, 5 and 6 flanges formed at the sides of the pad.

The pad is preferably formed of a flat piece of material with the corners removed to form the flanges 3, 4, 5 and 6, and the edges are provided with fold lines 7, 8, 9 and 10, which may be scored in the surface of the pad to facilitate folding the flaps to positions at right angles to the pad.

The central portion 2 is formed by making cuts 11, 12, 13 and 14 around the edges of the pad, leaving the collar 1, and providing perforated sections 15, 16, 17, and 18 at the corners. The cuts in the drawing are in the form of a plurality of curves substantially forming semicircles, thereby forming scallops, however, it will be understood that these cuts may be formed in various designs, and may produce different decorative or ornamental effects. It will be understood, therefore, that the central portion may be cut by lines of any type, and as hereinbefore stated, it is preferred to leave uncut or perforated sections at the corners to hold the central part in place until the pad is inserted in the box, and at the same time the cuts are sufficient to permit ready removal of the central part when the top of the box has been removed.

It will be understood that other changes may be made in the construction, design, or arrangement of the pad without departing from the spirit of the invention. One of which changes may be in the use of one pad to cover the entire upper surface of a box, another may be in the use of other means for holding the pad in place, and still another may be in the use of other means for providing a removable section in the central part of the pad.

In use it is preferred to use the pad in boxes packed from the bottom, that is, with the top 19 of the box inverted, and with the bottom of the box open and extending upward, and with the box in this position the pad is first placed in the bottom with the flanges 3, 4, 5 and 6 extending upward, and with the collar 1 and central part 2 in a flat position against the inner surface of the top 19; and then when the box is inverted and opened the pad will be in the position shown in Figure 4, and with the central part removed, the scallops 20 may be bent upward providing decoration around the fruit in the box with the fruit showing through the scallops or opening in the central part of the pad. It will be understood that this device may be used in boxes formed in two halves, as shown in Figure 1, in which the box is indicated by the numeral 21, or in boxes in which the entire inner part is open, and it will also be understood that the pad may be made of any material or of any color, and also of any design. The pad may also be waxed or coated with paraffin or any suitable material on the fruit contacting surface to prevent friction bruising.

Having thus fully described the invention, what I claim as new, and desire to secure by Letters Patent, is:

In combination, a box for apples or the like, and a protective and inspection display pad, liner, and collar, of the type comprising a continuous sheet of opaque material forming a separate supplemental element adapted to be placed in the box under the cover thereof with the box in an inverted position, and having a removable central portion, cut through the material continuously on the four sides of said central portion forming scallops on the said four sides with the end scallops extending into the corners and separated by perforated lines, whereby said central portion may be raised for inspection, and also torn on the perforated lines at the corners for complete removal of said central portion from the said pad, liner, and collar, after the box is opened and the surrounding sides of the remaining portion forming decoration around the fruit in the box, said fruit being displayed through the opening from which the central portion has been removed, said pad, collar, and liner having flanges at the sides extending into the box between the sides thereof and fruit that may be placed therein.

CARL E. RIDGWAY.